United States Patent
Easter

(10) Patent No.: US 7,683,113 B2
(45) Date of Patent: Mar. 23, 2010

(54) INSULATION COMPOSITIONS CONTAINING METALLOCENE POLYMERS

(75) Inventor: Mark R. Easter, Indianapolis, IN (US)

(73) Assignee: General Cable Technologies Corporation, Highland Heights, KY (US)

( * ) Notice: Subject to any disclaimer, the term of this patent is extended or adjusted under 35 U.S.C. 154(b) by 385 days.

(21) Appl. No.: 10/995,171

(22) Filed: Nov. 24, 2004

(65) Prior Publication Data

US 2005/0133248 A1   Jun. 23, 2005

Related U.S. Application Data

(62) Division of application No. 10/370,488, filed on Feb. 24, 2003, now Pat. No. 6,825,253.

(60) Provisional application No. 60/397,026, filed on Jul. 22, 2002.

(51) Int. Cl.
*C08K 5/17* (2006.01)
*C08K 5/3437* (2006.01)
*C08L 23/16* (2006.01)
*H01B 3/30* (2006.01)

(52) U.S. Cl. ............... 524/252; 524/254; 524/255; 524/257; 524/258; 524/251; 524/236; 524/570; 524/583; 524/585; 174/110 SR

(58) Field of Classification Search ............... 524/574, 524/579, 236, 251, 582, 583, 86, 252, 254, 524/256, 585, 580; 174/110 SR
See application file for complete search history.

(56) References Cited

U.S. PATENT DOCUMENTS

| 4,590,231 | A | * | 5/1986 | Seltzer et al. ............... 524/100 |
| 4,918,127 | A | * | 4/1990 | Adur et al. .................. 524/415 |
| 5,086,134 | A | * | 2/1992 | Antberg et al. .............. 526/126 |
| 5,403,892 | A | * | 4/1995 | Puydak et al. .............. 525/192 |
| 6,232,376 | B1 | * | 5/2001 | Tsukada et al. .............. 524/99 |
| 6,268,438 | B1 | * | 7/2001 | Ellul et al. .................. 525/240 |
| 6,291,772 | B1 | * | 9/2001 | Easter et al. .......... 174/102 SC |
| 7,473,742 | B2 | * | 1/2009 | Easter ........................ 525/383 |
| 2002/0123572 | A1 | * | 9/2002 | Park et al. .................... 525/191 |

FOREIGN PATENT DOCUMENTS

JP    2001-155556    *    6/2001

OTHER PUBLICATIONS

JP 2001-155556 (Jun. 8, 2001); Kimura et al., abstract and translation in English.*

* cited by examiner

*Primary Examiner*—David Wu
*Assistant Examiner*—Rip A. Lee
(74) *Attorney, Agent, or Firm*—Blank Rome, LLP

(57) ABSTRACT

Novel additive systems for metallocene based filled cable insulation are disclosed. These systems provide excellent protection against thermal degradation, better cure state and reduced dissipation factor after prolonged heat exposure. The additives may contain one or more hindered amine light stabilizers and amine antioxidants.

7 Claims, No Drawings

INSULATION COMPOSITIONS CONTAINING METALLOCENE POLYMERS

This application is a divisional of U.S. Ser. No. 10/370,488 filed Feb. 24 2003 which issued on Nov. 30, 2004 as U.S. Pat. No. 6,825,253; which claims the benefit under 35 U.S.C. 119(e) of U.S. Provisional Application Ser. No. 60/397,026, filed Jul. 22, 2002.

FIELD OF THE INVENTION

The invention relates to insulation compositions for electric power cables having a base polymer comprising at least one metallocene polymer, a filler; and an additive comprising a blend of (i) an amine antioxidant and (ii) at least one hindered amine light stabilizer, or 2,5-Di(tert-amyl)hydroquinone (TAHQ), or mixtures of said stabilizer(s) and TAHQ.

BACKGROUND OF THE INVENTION

Typical power cables generally have one or more conductors in a core that is surrounded by several layers that can include: a first polymeric semiconducting shield layer, a polymeric insulating layer, a second polymeric semiconducting shield layer, a metallic tape shield and a polymeric jacket.

Polymeric materials have been utilized in the past as electrical insulating and semiconducting shield materials for power cables. In services or products requiring long-term performance of an electrical cable, such polymeric materials, in addition to having suitable dielectric properties, must be durable. For example, polymeric insulation utilized in building wire, electrical motor or machinery power wires, or underground power transmitting cables, must be durable for safety and economic necessities and practicalities.

One major type of failure that polymeric power cable insulation can undergo is the phenomenon known as treeing. Treeing generally progresses through a dielectric section under electrical stress so that, if visible, its path looks something like a tree. Treeing may occur and progress slowly by periodic partial discharge. It may also occur slowly in the presence of moisture without any partial discharge, with moisture and discharge, or it may occur rapidly as the result of an impulse voltage. Trees may form at the site of a high electrical stress such as contaminants or voids in the body of the insulation-semiconductive screen interface. In solid organic dielectrics, treeing is the most likely mechanism of electrical failures, which do not occur catastrophically, but rather appear to be the result of a more lengthy process. In the past, extending the service life of polymeric insulation has been achieved by modifying the polymeric materials by blending, grafting, or copolymerization of silane-based molecules or other additives so that either trees are initiated only at higher voltages than usual or grow more slowly once initiated.

There are two kinds of treeing known as electrical treeing and water treeing. Electrical treeing results from internal electrical discharges that decompose the dielectric. High voltage impulses can produce electrical trees. The damage, which results from the application of moderate alternating current voltages to the electrode/insulation interfaces, which can contain imperfections, is commercially significant. In this case, very high, localized stress gradients can exist and with sufficient time can lead to initiation and growth of trees. An example of this is a high voltage power cable or connector with a rough interface between the conductor or conductor shield and the primary insulator. The failure mechanism involves actual breakdown of the modular structure of the dielectric material, perhaps by electron bombardment. In the past much of the art has been concerned with the inhibition of electrical trees.

In contrast to electrical treeing, which results from internal electrical discharges that decompose the dielectric, water treeing is the deterioration of a solid dielectric material, which is simultaneously exposed to liquid or vapor and an electric field. Buried power cables are especially vulnerable to water treeing. Water trees initiate from sites of high electrical stress such as rough interfaces, protruding conductive points, voids, or imbedded contaminants, but at lower voltages than that required for electrical trees. In contrast to electrical trees, water trees have the following distinguishing characteristics; (a) the presence of water is essential for their growth; (b) no partial discharge is normally detected during their initiation; (c) they can grow for years before reaching a size that may contribute to a breakdown; (d) although slow growing, they are initiated and grow in much lower electrical fields than those required for the development of electrical trees.

Electrical insulation applications are generally divided into low voltage insulation (less than 1 K volts), medium voltage insulation (ranging from 1 K volts to 65 K volts), and high voltage insulation (above 65 K volts). In low to medium voltage applications, for example, electrical cables and applications in the automotive industry, electrical treeing is generally not a pervasive problem and is far less common than water treeing, which frequently is a problem. For medium-voltage applications, the most common polymeric insulators are made from either polyethylene homopolymers or ethylene-propylene elastomers, otherwise known as ethylene-propylene-rubber (EPR) or ethylene-propylene-diene ter-polymer (EPDM).

Polyethylene is generally used neat (without a filler) as an electrical insulation material. Polyethylenes have very good dielectric properties, especially dielectric constants and power factors. The dielectric constant of polyethylene is in the range of about 2.2 to 2.3. The power factor, which is a function of electrical energy dissipated and lost and should be as low as possible, is around 0.0002 at room temperature, a very desirable value. The mechanical properties of polyethylene polymers are also adequate for utilization in many applications as medium-voltage insulation, although they are prone to deformation at high temperatures. However, polyethylene homopolymers are very prone to water treeing, especially toward the upper end of the medium-voltage range.

There have been attempts to make polyethylene-based polymers that would have long-term electrical stability. For example, when dicumyl peroxide is used as a crosslinking agent for polyethylene, the peroxide residue functions as a tree inhibitor for some time after curing. However, these residues are eventually lost at most temperatures where electrical power cable is used. U.S. Pat. No. 4,144,202 issued Mar. 13, 1979 to Ashcraft, et al. discloses the incorporation into polyethylenes of at least one epoxy containing organosilane as a treeing inhibitor. However, a need still exists for a polymeric insulator having improved treeing resistance over such silane containing polyethylenes.

Unlike polyethylene, which can be utilized neat, the other common medium-voltage insulator, EPR, typically contains a high level of filler in order to improve thermal properties and reduce cost. When utilized as a medium-voltage insulator, EPR will generally contain about 20 to about 50 weight percent filler, most likely calcined clay, and is preferably crosslinked with peroxides. The presence of the filler gives EPR a high resistance against the propagation of trees. EPR also has mechanical properties, which are superior to polyethylene at elevated temperatures.

Unfortunately, while the fillers utilized in EPR may help prevent treeing, the filled EPR will generally have poorer dielectric properties, i.e. a poorer dielectric constant and a poor power factor. The dielectric constant of filled EPR is in the range of about 2.3 to about 2.8. Its power factor is on the order of about 0.002 to about 0.005 at room temperature, which is approximately an order of magnitude worse than polyethylene.

Thus, both polyethylenes and EPR have serious limitations as an electrical insulator in cable applications. Although polyethylene polymers have good electric properties, they have poor water tree resistance. While filled EPR has good treeing resistance and good mechanical properties, it has dielectric properties inferior to polyethylene polymers.

Power factor increases with temperature. In addition it may continue to increase with time at high temperatures. Underwriters Labs MV105 rated cables must be able to survive 21 days at an emergency circuit overload temperature of 140° C. Filled EPR insulations are usually used in these applications.

Another class of polymers is described in EP-A-0 341 644 published Nov. 15, 1989. This reference describes linear polyethylenes produced by a traditional Ziegler-Natta catalyst systems. They generally have a broad molecular weight distribution similar to linear low-density polyethylene and at low enough densities can show better tree retardancy. However, these linear-type polymers in the wire and cable industry have poor melt flow characteristics and poor processability. In order to achieve a good mix in an extruder, linear polymers must be processed at a temperature at which the peroxides present in the polymer prematurely crosslink the polymers, a phenomenon commonly referred to as scorch. If the processing temperature is held low enough to avoid scorch, incomplete melting occurs because of the higher melting species in linear polymers having a broad molecular weight distribution. This phenomenon results in poor mixing, surging extruder pressures, and other poor results.

Newer metallocene polyethylene co-polymers are more flexible and have been proposed for use as cable insulation but they also have generally poorer thermal stability, and may deform when exposed to high heat. They also suffer from higher electrical loss with AC current which may be measured in the form of a dissipation factor called tan delta.

1,2-dihydro-2-2-4 trimethylquinolines or "TMQs" are the universally preferred antioxidants for filled LV, MV or HV cable insulations because of their good thermal degradation protection, low interference with the peroxide cure systems widely used and low cost. TMQs are not used in polyethylene insulation because of their staining nature.

Hindered amine light stabilizers or "HALS" are primarily used in clear plastic film, sheets or coatings to prevent degradation by light. HALS are used in unfilled polyethylene insulations. They are thought to prevent degradation caused by light emitted by tiny electrical discharges. U.S. Pat. No. 5,719,218 discloses an optically transparent polyethylene insulation formulation with a HAL where it is stated that the HALS are useful for the prevention of degradation of the insulation by water trees.

EPDM type insulations have excellent resistance to water trees and have been used for over 30 years in AC cable insulations exposed to wet environments. They are also proven to perform in high temperature service in urban power networks. Filled insulations are opaque so they do not suffer from degradation caused by light emitted by tiny electrical discharges.

Metallocene polymers have shown much higher resistance to water trees than polyethylene but are not widely used as medium or high voltage AC cable insulation due to their higher AC loss and generally poorer thermal degradation resistance and higher cost than polyethylene. Metallocene polymers do have good acceptance of fillers and can be used for flexible, low temperature, low voltage or DC insulations. Unfilled polyethylene compositions such as those disclosed in U.S. Pat. No. 5,719,218 are prone to staining when certain additives such as TMQ are present, as discussed above. WO 02/29829 uses the unfilled polyethylene composition disclosed in U.S. Pat. No. 5,719,218 in an unfilled strippable insulation composition which contains a tetramethylpiperidine hindered amine light stabilizer additive.

Therefore, a need exists in the electrical cable industry for an additive system that improves the performance of metallocene polymers as a filled insulation composition.

SUMMARY OF THE INVENTION

The invention provides an additive system that improves the performance of metallocene polymers when used as a filled insulation composition.

Specifically, the invention provides an insulation composition for electric cable comprising; (a) a base polymer comprising at least one metallocene polymer; (b) a filler; and (c) an additive comprising a blend of; (i) an amine antioxidant, and (ii) a hindered amine light stabilizer or stabilizers, or 2,5-Di(tert-amyl)hydroquinone (TAHQ), or mixtures of said stabilizer(s) and TAHQ.

In another embodiment of the invention, the insulation composition base polymer further comprises at least one non-metallocene polymer.

In embodiments of the invention, the base polymer may comprise 20% to 99% by weight metallocene polymer and 1% to 80% by weight non-metallocene polymer, and the additive may be from about 0.25% to about 2.5% by weight of said insulation composition, preferably from about 0.5% to about 1.5% by weight of said insulation composition.

DETAILED DESCRIPTION OF THE INVENTION

The invention particularly relates to polymeric compositions utilizing polyolefins, which compositions have a unique combination of good mechanical properties, good dielectric properties, and good water treeing resistance, as well as a lower melt temperature for improved processability when the compositions include peroxide-containing compounds. The products are extremely useful as insulation compositions for electric power cables.

The polymers utilized in the protective jacketing, insulating, conducting or semiconducting layers of the inventive cables of the invention may be made by any suitable process which allows for the yield of the desired polymer with the desired physical strength properties, electrical properties, tree retardancy, and melt temperature for processability.

The base polymer in accordance with the invention comprises at least one metallocene polymer, and also may include, if desired, non-metallocene polymers.

Metallocene polymers are produced using a class of highly active olefin catalysts known as metallocenes, which for the purposes of this application are generally defined to contain one or more cyclopentadienyl moiety. The manufacture of metallocene polymers is described in U.S. Pat. No. 6,270,856 to Hendewerk, et al, the disclosure of which is incorporated by reference in its entirety.

Metallocenes are well known especially in the preparation of polyethylene and copolyethylene-alpha-olefins. These catalysts, particularly those based on group IV transition metals, zirconium, titanium and hafnium, show extremely high activity in ethylene polymerization. Various forms of the catalyst system of the metallocene type may be used for polymerization to prepare the polymers used in this invention, including but not limited to those of the homogeneous, supported catalyst type, wherein the catalyst and cocatalyst are together supported or reacted together onto an inert support for polymerization by a gas phase process, high pressure process, or a slurry, solution polymerization process. The metallocene catalysts are also highly flexible in that, by manipulation of the catalyst composition and reaction conditions, they can be made to provide polyolefins with controllable molecular weights from as low as about 200 (useful in applications such as lube-oil additives) to about 1 million or higher, as for example in ultra-high molecular weight linear polyethylene. At the same time, the MWD of the polymers can be controlled from extremely narrow (as in a polydispersity of about 2), to broad (as in a polydispersity of about 8).

Exemplary of the development of these metallocene catalysts for the polymerization of ethylene are U.S. Pat. No. 4,937,299 and EP-A-0 129 368 to Ewen, et al., U.S. Pat. No. 4,808,561 to Welborn, Jr., and U.S. Pat. No. 4,814,310 to Chang, which are all hereby are fully incorporated by reference. Among other things, Ewen, et al. teaches that the structure of the metallocene catalyst includes an alumoxane, formed when water reacts with trialkyl aluminum. The alumoxane complexes with the metallocene compound to form the catalyst. Welborn, Jr. teaches a method of polymerization of ethylene with alpha-olefins and/or diolefins. Chang teaches a method of making a metallocene alumoxane catalyst system utilizing the absorbed water in a silica gel catalyst support. Specific methods for making ethylene/alpha-olefin copolymers, and ethylene/alpha-olefin/diene terpolymers are taught in U.S. Pat. No. 4,871,705 (issued Oct. 3, 1989) and U.S. Pat. No. 5,001,205 (issued Mar. 19, 1991) to Hoel, et al., and in EP-A-0 347 129 published Apr. 8, 1992, respectively, all of which are hereby fully incorporated by reference.

Other cocatalysts may be used with metallocenes, such as trialkylaluminum compounds or ionizing ionic activators, such as tri(n-butyl)ammonium tetra(pentafluorophenyl) boron, which ionize the neutral metallocene compound. Such ionizing compounds may contain an active proton or some other cation such as carbonium, which ionizing the metallocene on contact, forms a metallocene cation associated with (but not coordinated or only loosely coordinated with) the remaining ion of the ionizing ionic compound. Such compounds are described in EP-A-0 277 003 and EP-A-0 277 004, both published Aug. 3, 1988, and are herein fully incorporated by reference. Also, the polymers useful in this invention can be a metallocene catalyst component that is a monocylopentadienyl compound, which is activated by either an alumoxane or an ionic activator to form an active polymerization catalyst system. Catalyst systems of this type are shown by PCT International Publication WO92/00333, published Jan. 9, 1992, U.S. Pat. Nos. 5,096,867 and 5,055,438, EP-A-0 420 436 and WO91/04257 all of which are fully incorporated herein by reference. The catalyst systems described above may be optionally prepolymerized or used in conjunction with an additive component to enhance catalytic productivity.

As previously stated, metallocene catalysts are particularly attractive in making tailored ultra-uniform and super-random specialty copolymers. For example, if a lower density copolymer is being made with a metallocene catalyst such as very low density polyethylene, (VLDPE), an ultra-uniform and super random copolymerization will occur, as contrasted to the polymer produced by copolymerization using a conventional Ziegler-Natta catalyst. In view of the ongoing need for electrical cables having improved mechanical and dielectric properties and improved water treeing resistance, as well as the need to process these materials at temperatures low enough to allow scorch free processing, it would be desirable to provide products utilizing the high quality characteristics of polyolefins prepared with metallocene catalysts.

The base polymer utilized in the insulation composition for electric cable in accordance with the invention may also be selected from the group of polymers consisting of ethylene polymerized with at least one comonomer selected from the group consisting of $C_3$ to $C_{20}$ alpha-olefins and $C_3$ to $C_{20}$ polyenes. Generally, the alpha-olefins suitable for use in the invention contain in the range of about 3 to about 20 carbon atoms. Preferably, the alpha-olefins contain in the range of about 3 to about 16 carbon atoms, most preferably in the range of about 3 to about 8 carbon atoms. Illustrative non-limiting examples of such alpha-olefins are propylene, 1-butene, 1-pentene, 1-hexene, 1-octene and 1-dodecene.

Preferably, the polymers utilized in the cables of the invention are either ethylene/alpha-olefin copolymers or ethylene/alpha-olefin/diene terpolymers. The polyene utilized in the invention generally has about 3 to about 20 carbon atoms. Preferably, the polyene has in the range of about 4 to about 20 carbon atoms, most preferably in the range of about 4 to about 15 carbon atoms. Preferably, the polyene is a diene, which can be a straight chain, branched chain, or cyclic hydrocarbon diene. Most preferably, the diene is a non conjugated diene. Examples of suitable dienes are straight chain acyclic dienes such as: 1,3-butadiene, 1,4-hexadiene and 1,6-octadiene; branched chain acyclic dienes such as: 5-methyl-1,4-hexadiene, 3,7-dimethyl-1,6-octadiene, 3,7-dimethyl-1,7-octadiene and mixed isomers of dihydro myricene and dihydroocinene; single ring alicyclic dienes such as: 1,3-cyclopentadiene, 1,4-cylcohexadiene, 1,5-cyclooctadiene and 1,5-cyclododecadiene; and multi-ring alicyclic fused and bridged ring dienes such as: tetrahydroindene, methyl tetrahydroindene, dicylcopentadiene, bicyclo-(2,2,1)-hepta-2-5-diene; alkenyl, alkylidene, cycloalkenyl and cycloalkylidene norbornenes such as 5-methylene-2morbornene (MNB), 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornene. Of the dienes typically used to prepare EPR's, the particularly preferred dienes are 1,4-hexadiene, 5-ethylidene-2-norbornene, 5-vinyllidene-2-norbornene, 5-methylene-2-norbornene and dicyclopentadiene. The especially preferred dienes are 5-ethylidene-2-norbornene and 1,4-hexadiene.

In preferred embodiments of the invention, the base polymer comprises metallocene EP which is an EPR or EPDM polymer prepared with metallocene catalysts. In embodiments of the invention, the base polymer may be metallocene EP alone, metallocene EP and at least one other metallocene polymer, or metallocene EP and at least one non-metallocene polymer as described below.

As an additional polymer in the base polymer composition, a non-metallocene base polymer may be used having the structural formula of any of the polyolefins or polyolefin copolymers described above. Ethylene-propylene rubber (EPR), polyethylene, polypropylene or ethylene vinyl acetates having a range of vinyl acetate content of from about 10% to about 40% may all be used in combination with the metallocene polymers in the base polymer.

In embodiments of the invention, the insulation composition base polymer comprises 20% to 99% by weight metallocene polymer or polymers and 1% to 80% by weight non-metallocene polymer or polymers. The additive is present in amounts from about 0.25% to about 2.5% by weight of said composition, preferably from about 0.5% to about 1.5% by weight of said composition. In preferred embodiments, the additive has a weight/weight ratio of HALS/TMQ of from about 90/10 to about 10/90, more preferably a weight/weight ratio of HALS/TMQ of from about 75/25 to about 25/75.

As described above, the additive in accordance with the invention comprises a blend of; (i) an amine antioxidant, and (ii) a hindered amine light stabilizer, or 2,5-Di(tert-amyl) hydroquinone (TAHQ) or mixtures of said stabilizer and TAHQ. In further embodiments of the invention, the additive in accordance with the invention comprises at least two hindered amine light stabilizers. In further embodiments of the invention, the additive in accordance with the invention comprises at least two hindered amine light stabilizers and TAHQ.

Any suitable hindered amine light stabilizer may be used in accordance with the invention, for example, Bis (2,2,6,6-tetramethyl-4-piperidyl) sebaceate (tinuvin 770); Bis (1,2,2,6,6-tetramethyl-4-piperidyl) sebaceate+methyl 1,2,2,6,6-tetramethyl-4-piperidyl sebaceate (tinuvin 765); 1,6-Hexanediamine, N,N'-Bis (2,2,6,6-tetramethyl-4-piperidyl) polymer with 2,4,6 trichloro-1,3,5-triazine, reaction products with N-butyl 2,2,6,6-tetramethyl-4-piperidinamine (Chimassorb 2020); Decanedioic acid, Bis (2,2,6,6-tetramethyl-1-(octyloxy)-4-piperidyl)ester, reaction products with 1,1-dimethylethylhydroperoxide and octane (Tinuvin 123); Triazine derivatives (tinuvin NOR 371); Butanedioic acid, dimethylester 4 hydroxy-2,2,6,6-tetramethyl-piperidine ethanol (Tinuvin 622), 1,3,5-Triazine-2,4,6-triamine,N,N'''-[1,2-ethane-diyl-bis [[[4,6-bis-[butyl(1,2,2,6,6pentamethyl-4-piperdinyl)amino]-1,3,5-triazine-2-yl]imino]-3,1-propanediyl]]bis [N',N''-dibutyl-N',N'' bis(2,2,6,6-tetramethyl-4-piperidyl) (Chimassorb 119). Chimassorb 944 LD and Tinuvin 622 LD are preferred hindered amine light stabilizers.

Any suitable amine antioxidant may be used in accordance with the invention, for example, 1,2-dihydro-2-2-4, trimethyiquinoline (Agerite MA, Agerite D, Flectol TMQ), octylated diphenylamine (Agerite Stelite), diphenyl-p-phenylene-diamine (Agerite DPPD), 4,4'-di(1,1-dimethylbenzyl)—diphenylamine (Naugard 445), ethoxy-1,2-dihydro-2-2-4 trimethyiquinoline (Santaflex AW), p,p'-dioctyldiphenylamine (Vanox 12), N-(1,3-dimethyl butyl)-N'-phenyl-p-phenylene diamine (Vulcanox 4020), N-phenyl-N'isopropyl-p-phenylene diamine (Vulcanox 4010), p-phenylene diamine (Wingstay 100). 1,2-dihydro-2-2-4, Trimethyiquinoline is a preferred amine antioxidant.

The insulating composition the invention is filled. An illustrative example of a suitable filler is clay, talc (aluminum silicate or magnesium silicate), magnesium aluminum silicate, magnesium calcium silicate, calcium carbonate, magnesium calcium carbonate, silica, ATH, magnesium hydroxide, sodium borate, calcium borate, kaolin clay, glass fibers, glass particles, or mixtures thereof. In accordance with the invention, the weight percent range for fillers is from about 10 percent to about 60 percent, preferably from about 20 to about 50 weight percent filler.

Other additives commonly employed in the polyolefin compositions utilized in the invention can include, for example, crosslinking agents, antioxidants, processing aids, pigments, dyes, colorants, metal deactivators, oil extenders, stabilizers, and lubricants.

All of the components of the compositions utilized in the invention are usually blended or compounded together prior to their introduction into an extrusion device from which they are to be extruded onto an electrical conductor. The polymer and the other additives and fillers may be blended together by any of the techniques used in the art to blend and compound such mixtures to homogeneous masses. For instance, the components may be fluxed on a variety of apparatus including multi-roll mills, screw mills, continuous mixers, compounding extruders and Banbury mixers.

After the various components of the composition are uniformly admixed and blended together, they are further processed to fabricate the cables of the invention. Prior art methods for fabricating polymer insulated cable and wire are well known, and fabrication of the cable of the invention may generally be accomplished any of the various extrusion methods.

In a typical extrusion method, an optionally heated conducting core to be coated is pulled through a heated extrusion die, generally a cross-head die, in which a layer of melted polymer is applied to the conducting core. Upon exiting the die, the conducting core with the applied polymer layer is passed through a heated vulcanizing section, or continuous vulcanizing section and then a cooling section, generally an elongated cooling bath, to cool. Multiple polymer layers may be applied by consecutive extrusion steps in which an additional layer is added in each step, or with the proper type of die, multiple polymer layers may be applied simultaneously.

The conductor of the invention may generally comprise any suitable electrically conducting material, although generally electrically conducting metals are utilized. Preferably, the metals utilized are copper or aluminum. In power transmission, aluminum conductor/steel reinforcement (ACSR) cable, aluminum conductor/aluminum reinforcement (ACAR) cable, or aluminum cable is generally preferred.

EXAMPLES

The samples in the tables were mixed in a 3.17 liter banbury at 70-75 RPM. Batch size was 2300 g-2500 g. Half of the polymer was added first. After the polymer fluxed, the clays, antioxidants, and pigments were added. The remaining polymer(s) were added next. After material fluxed, the wax was added. The material was removed from the banbury when the temperature reached 275° F. Total mix time was 4-8 minutes.

For the $2^{nd}$ pass Banbury the mix speed was at 50-60 RPM. Half of the material from the $1^{st}$ pass was added, and after it fluxed the peroxide was added. Then the remainder of the material was added. The material was removed from the banbury when the temperature reached 230° F. Total mix time was 1.5-5 minutes.

Samples were pressed to 45 mill cured slab at 350 degrees F. for 20 minutes.

Samples were tested for Dissipation factor with a Tettex 2818 dissipation factor test set connected to a Tettex 2914 precision solids dielectric cell as follows 1. Degas Slabs overnight in Vacuum Oven @ 70° C.
2. Measure Unaged SIC/TD @ 130° C.
3. Age slabs 14 days @ 140° C.
4. Measure Aged SIC/TD@ 130° C.

Tensile properties were tested according to ASTM D412

Mh was tested on an Alfa Technologies MDR 2000 with ½ degree arc and scorch was tested on an Alfa Technologies Mooney 2000.

The following materials were used:

Antioxidants

Agerite TMQ/, Polymerized 1,2-dihydro-2,2,4-trimethylquinoline, Antioxidant, R.T. Vanderbilt Company, Inc., Norwalk, Conn.

Irganox 1035, Thiodiethylene bis(3,5-di-(tert)-butyl-4-hydroxyhydrocinnamate, Antioxidant, Ciba Specialty Chemicals Corp., Tarrytown, N.Y.

Naugard 76, Octadecyl,3,5,-di-tert-butyl-4-hydroxyhydrocinnamate, Antioxidant, Uniroyal Chemical Company, Inc., Middlebury, Conn.

Vanox AM, 2-Propanone, Antioxidant, R.T. Vanderbilt Company, Inc., Norwalk, Conn.

Vanox DSTDP, Distearyl thiodipropionate, Secondary Antioxidant, R.T. Vanderbilt Company, Inc., Norwalk, Conn.

Vanox ZMTI, 2H-Benzimidazole-2-thione,1,3-dihydro-4 (or 5)-methyl-, Antioxidant, R.T. Vanderbilt Company, Inc., Norwalk, Conn.

TAHQ

Santovar TAHQ, 2,5-Di(tert-amyl)hydroquinone, A, Flexsys Amerikca L.P., Akron, Ohio

HALS

Chimassorb 81, 2-Hydroxy-4-n-octoxybenzophenone, Ciba Specialty Chemicals Corp., Tarrytown, N.Y.

Chimassorb 944 LD, Poly[[6-[(1,1,3,3-tetramethylbutyl) amino]-1,3,5-triazine-2,4-diyl]], Ciba Specialty Chemicals Corp., Tarrytown, N.Y.

Tinuvin 622 LD, Dimethyl succinate polymer w/4-hydroxy-2,2,6,6,-tertramethyl-1-piperidineethanol, Ciba Specialty Chemicals Corp., Tarrytown, N.Y.

Tinuvin 783 FDL, 50% by wt Tinuvin 622 and 50% by wt Chimassorb 944, Light Stabilizer, Ciba Specialty Chemicals Corp., Tarrytown, N.Y.

Polymers

Vistalon, Ethylene Propylene Diene Rubber, Polymer, 0.86 g/ml, ExxonMobil Chemical Company, Houston, Tex.

Engage 8200, Copolymer of Ethylene and Octene-1, Polymer, 0.87 g/ml, Dupont Dow Elastomers L. L. C., Wilmington, Del.

Exact 4006, Ethylene-Olefin Copolymer, Polymer, 0.9 g/ml, ExxonMobil Chemical Company, Houston, Tex.

LDPE, Low-density Polyethylene, Polymer, 0.92 g/ml, Equistar Chemicals, LP, Houston, Tex.

Filler

Polyfil, Chemically Treated Anhydrous Aluminum Silicate, Filler, Huber Engineered Materials, Macon, Ga.

Minor Ingredients

Red Lead, Lead(II,IV)-oxide, Activator, Hammond Lead Products, Hammond, Ind.

Recco 140, Paraffin Wax, Processing Aid, R.E. Carroll Inc., Trenton, N.J.

(Silane) A172-50 G, 50% Vinyl-tris (2-methoxyethoxy) silane in a 50% elastomeric (EPDM), Coupling Agent, UA Rubber Specialty Chemical Sdn. Bhd., Bukit Mertajam. Malaysia Zinc Oxide, Activator, U.S. Zinc Corp., Chicago, Ill.

DI-Cup, Dicumyl Peroxide, Cross-Linker, Hercules Incorporated, Wilmington, Del.

| ANTIOXIDANT STUDY | | | | | | |
|---|---|---|---|---|---|---|
| | COMPARATIVE EXAMPLES | | | | | |
| | A | B | C | D | E | F |
| Vistalon EPDM | 51 | | | | | |
| Engage 8200 | | 51 | 51 | 51 | 51 | 51 |
| Exact 4006 | | | | | | |
| LPDE | 10 | 10 | 10 | 10 | 10 | 10 |
| A172 treated clay filler | 28.9 | 28.9 | 28.9 | 28.9 | 28.9 | 28.9 |
| Paraffin Wax | 2.8 | 2.8 | 2.8 | 2.8 | 2.8 | 2.8 |
| red lead | 3 | 3 | 3 | 3 | 3 | 3 |
| (A172) silane | 0.5 | 0.5 | 0.5 | 0.5 | 0.5 | 0.5 |
| Zinc oxide | 2.8 | 2.8 | 2.8 | 2.8 | 2.8 | 2.8 |
| Agerite TMQ | 1 | 1 | 0.75 | | | |
| DSTDP | | | .25 | | .25 | |
| naugard 76 | | | | 1 | | |
| vanox ZMTI | | | | | | |
| Irganox 1035 | | | | | 0.75 | |
| Chimassorb 944 | | | | | | |
| Tinuvin 783FDL | | | | | | |
| Tinuvin 622LD | | | | | | |
| Vanox ZMTI | | | | | | 0.25 |
| Santovar TAHQ | | | | | | |
| Vanox AM | | | | | | 0.75 |
| Dicup | 1.5 | 1.5 | 1.5 | 1.5 | 1.5 | 1.5 |
| TOTAL | 101.5 | 101.5 | 101.5 | 101.5 | 101.5 | 101.5 |
| Tan Delta at 130 C. % | 1.3 | 3.6 | 3.6 | NA | NA | 3.8 |
| Tan Delta 130 C. % aged 14 d 140 C. | 1.2 | 10 | 11.3 | | | 12 |
| Tan Delta 130 C. % aged 21 d 140 C. | 1.1 | 8.7 | 10.5 | | | 12.4 |
| MDR reports min. to min. | 6 Min @ 400° F. | | | | | |
| MH | 14.6 | 6.6 | 6.54 | 10.35 | 10.2 | 7.65 |
| ML | 0.83 | 0.22 | 0.21 | 0.23 | 0.23 | 0.2 |

-continued

ANTIOXIDANT STUDY

MOONEY SCORCH 130° C./30 min

| | | | | | | |
|---|---|---|---|---|---|---|
| SCORCH TIME @ Ts 5 INITIAL | 30 | 30 | 30 | 30 | 30 | 40 |
| TENSILE (PSI) | 1791 | 1812 | 1760 | 1903 | 1909 | 1850 |
| % ELONGATION | 315 | 471 | 525 | 490 | 477 | 515 |

AGED 21 Days 140° C.

| | | | | | | |
|---|---|---|---|---|---|---|
| % TENS RETAINED | 91 | 91 | 92 | 0 | 4 | 88 |
| % ELONG RETAINED | 92 | 105 | 98 | 0 | 1 | 94 |

AGED 21 Days 150° C.

| | | | | | | |
|---|---|---|---|---|---|---|
| % TENS RETAINED | 67 | 32 | 71 | 0 | 0 | 58 |
| % ELONG RETAINED | 70 | 7 | 67 | 0 | 0 | 41 |

Invention Examples 1-8 According to Invention and Comparative Example G

| | 1 | 2 | 3 | 4 | 5 | G | 6 | 7 | 8 |
|---|---|---|---|---|---|---|---|---|---|
| Vistalon EPDM | | | | | | | | | |
| Engage 8200 | 51 | 51 | 51 | 51 | 51 | | | | |
| Exact 4006 | | | | | | 51 | 51 | 51 | 51 |
| LPDE | 10 | 10 | 10 | 10 | 10 | 10 | 10 | 10 | 10 |
| A172 treated clay filler | 28.9 | 28.9 | 28.9 | 28.9 | 28.9 | 28.9 | 28.9 | 28.9 | 28.9 |
| Paraffin Wax | 2.8 | 2.8 | 2.8 | 2.8 | 2.8 | 2.8 | 2.8 | 2.8 | 2.8 |
| red lead | 3 | 3 | 3 | 3 | 3 | 3 | 3 | 3 | 3 |
| (A172) silane | 0.5 | 0.5 | 0.5 | 0.5 | 0.5 | 0.5 | 0.5 | 0.5 | 0.5 |
| Zinc oxide | 2.8 | 2.8 | 2.8 | 2.8 | 2.8 | 2.8 | 2.8 | 2.8 | 2.8 |
| Agerite TMQ | | 0.5 | 0.5 | 0.75 | 0.75 | 1 | 0.75 | | 0.7 |
| DSTDP | | | | | | | | | |
| naugard 76 | | | | | | | | | |
| vanox ZMTI | | | | | | | | | |
| Irganox 1035 | | | | | | | | | |
| Chimassorb 944 | 1 | | | 0.25 | | | | 1 | 0.3 |
| Tinuvin 783FDL | | | 0.5 | | | | | | |
| Tinuvin 622LD | | 0.5 | | | | | | | |
| Vanox ZMTI | | | | | | | | | |
| Santovar TAHQ | | | | | 0.25 | | 0.25 | | |
| Vanox AM | | | | | | | | | |
| Dicup | 1.5 | 1.5 | 1.5 | 1.5 | 1.5 | 1.5 | 1.5 | 1.5 | 1.5 |
| TOTAL | 101.5 | 101.5 | 101.5 | 101.5 | 101.5 | 101.5 | 101.5 | 101.5 | 101.5 |
| Tan Delta at 130 C. % | 2.5 | 1.9 | 2.27 | 3.7 | 3 | 1.25 | 1.34 | 1.29 | 1.3 |
| Tan Delta 130 C. % | | | | | | | | | |
| aged 14 d 140 C. | 4.7 | 4.6 | 6.9 | 9.36 | 10.5 | 1.3 | 0.93 | 0.92 | 0.92 |
| Tan Delta 130 C. % | | | | | | | | | |
| aged 21 d 140 C. | 5.1 | 5.5 | 6.6 | 9.5 | 12.9 | 1.3 | 0.9 | 0.85 | 0.84 |
| MDR reports min. to min. | | | | | | | | | |
| MH | 6.77 | 9.57 | 8.85 | 6.64 | 7.05 | 10.7 | 11.26 | 12.8 | 11 |
| ML | 0.24 | 0.3 | 0.27 | 0.2 | 0.17 | 0.13 | 0.11 | 0.16 | 0.14 |

MOONEY SCORCH 130° C./30 min

| | 1 | 2 | 3 | 4 | 5 | G | 6 | 7 | 8 |
|---|---|---|---|---|---|---|---|---|---|
| SCORCH TIME @ Ts 5 INITIAL | 20.4 | 28.8 | 25 | 30 | 40 | 28.5 | 30 | 22 | 30 |
| TENSILE (PSI) | 1807 | 1883 | 1876 | 1747 | 1834 | 1995 | 1987 | 2121 | 2005 |
| % ELONGATION | 555 | 492 | 493 | 510 | 521 | 332 | 471 | 532 | 501 |

AGED 21 Days 140° C.

| | 1 | 2 | 3 | 4 | 5 | G | 6 | 7 | 8 |
|---|---|---|---|---|---|---|---|---|---|
| % TENS RETAINED | 88 | 93 | 94 | 94 | 96 | 89 | 92 | 77 | 92 |
| % ELONG RETAINED | 81 | 103 | 98 | 99 | 99 | 97 | 96 | 72 | 99 |

AGED 21 Days 150° C.

| | 1 | 2 | 3 | 4 | 5 | G | 6 | 7 | 8 |
|---|---|---|---|---|---|---|---|---|---|
| % TENS RETAINED | 53 | 84 | 79 | 81 | 76 | 70.9 | 38.7 | 43 | 68 |
| % ELONG RETAINED | 40 | 79 | 86 | 85 | 83 | 70 | 14 | 32 | 93 |

The antioxidant systems of the invention provide good protection against thermal degradation, better cure state and reduced dissipation factor after prolonged heat exposure in filled metallocene AC insulations.

In particular, the demonstrated additive systems comprising TAHQ improve heat aging and scorch properties. The demonstrated additive systems comprising one or more HALS improve Tan Delta, usually improve heat aging properties and sometimes improve scorch properties. It is expected that additive systems comprising both TAHQ and one or more HALS would obtain at least the individual benefits of both.

Lettered examples are comparative examples and numbered examples are examples in accordance with the invention.

Comparative Example A shows the good thermal and electrical properties of a traditional Zeigler-Natta EPR rubber formulation. Comparative Example B shows the poor performance of a metallocene polymer in the same formulation. Comparative Examples C-F show poor performance with other known antioxidant systems. Embodiments of the invention as shown in Examples 1 to 3 show the greatly improved thermal properties and dramatically improved dissipation factor after aging. Embodiments of the invention as shown in Examples 4 and 5 do not show improved electrical properties but do show the greatly improved thermal properties. In fact, Embodiments of the invention as shown in Examples 2 to 5 show superior thermal properties to Example A. Embodiments of the invention as shown in Examples 2, 3 and 5 show an increased state of cure as compared to Example B.

Dissipation factors were generally higher because the Engage 8200 polymer was not electrical grade.

Comparative Example G shows a different metallocene polymer that had better thermal and electrical properties but still showed electrical improvement with the antioxidant systems of the invention. Embodiments of the invention as shown in Example 8 show improved thermal properties at 150 C and Embodiments of the invention as shown in Examples 6, 7, and 8 show higher cure state.

While the present invention has been described and illustrated by reference to particular embodiments thereof, it will be appreciated by those of ordinary skill in the art that the invention lends itself to variations not necessarily illustrated herein.

For this reason, then, reference should be made solely to the appended claims for the purposes of determining the true scope of this invention.

What is claimed is:

1. An insulation composition for electric cable consisting of:
    (a) metallocene ethylene-propylene (EP) polymer;
    (b) a filler; and
    (c) an additive blend of
        (i) an amine antioxidant selected from the group consisting of 1,2-dihydro-2,2,4-trimethylquinoline, octylated diphenylamine, diphenyl-p-phenylenediamine, 4,4'-di-(1,1-dimethylbenzyl)diphenylamine, ethoxy-1,2-dihydro-2,2,4-trimethylquinoline, p,p'-dioctyldiphenylamine, N-(1,3-dimethylbutyl)-N'-phenyl-p-phenylene diamine, N-phenyl-N'-isopropyl-p-phenylene diamine, and p-phenylene diamine, and
        (ii) a hindered amine light stabilizer.

2. An insulation composition according to claim 1 wherein said additive is from about 0.25% to about 2.5% by weight of said composition.

3. An insulation composition according to claim 1 wherein said additive is from about 0.5% to about 1.5% by weight of said composition.

4. An electrical cable comprising a conducting core; and an insulation covering said core, wherein the insulation consists of
    (a) metallocene ethylene-propylene (EP) polymer;
    (b) a filler; and
    (c) an additive blend of
        (i) an amine antioxidant selected from the group consisting of 1,2-dihydro-2,2,4-trimethylquinoline, octylated diphenylamine, diphenyl-p-phenylenediamine, 4,4'-di-(1,1-dimethylbenzyl)diphenylamine, ethoxy-1,2-dihydro-2,2,4-trimethylquinoline, p,p'-dioctyldiphenylamine, N-(1,3-dimethylbutyl)-N'-phenyl-p-phenylene diamine, N-phenyl-N'-isopropyl-p-phenylene diamine, and p-phenylene diamine, and
        (ii) a hindered amine light stabilizer.

5. An electrical cable according to claim 4 wherein said additive is from about 0.25% to about 2.5% by weight of said composition.

6. An electrical cable according to claim 4 wherein said additive is from about 0.5% to about 1.5% by weight of said composition.

7. An electrical cable according to claim 4 wherein said conducting core comprises copper or aluminum.

* * * * *